(12) United States Patent
Agrawal

(10) Patent No.: US 8,577,811 B2
(45) Date of Patent: Nov. 5, 2013

(54) IN-BAND TRANSACTION VERIFICATION

(75) Inventor: Sunil Agrawal, Milpitas, CA (US)

(73) Assignee: Adobe Systems Incorporated, San Jose, CA (US)

( * ) Notice: Subject to any disclaimer, the term of this patent is extended or adjusted under 35 U.S.C. 154(b) by 399 days.

(21) Appl. No.: 11/945,849

(22) Filed: Nov. 27, 2007

(65) Prior Publication Data

US 2013/0124425 A1    May 16, 2013

(51) Int. Cl.
*G06Q 20/00*   (2012.01)
*G06F 7/04*    (2006.01)

(52) U.S. Cl.
USPC .............................................. 705/75; 726/2

(58) Field of Classification Search
USPC .......................................................... 705/75
See application file for complete search history.

(56) References Cited

U.S. PATENT DOCUMENTS

| | | | |
|---|---|---|---|
| 5,955,717 A | | 9/1999 | Vanstone |
| 6,049,785 A * | | 4/2000 | Gifford ........................... 705/39 |
| 7,200,576 B2 * | | 4/2007 | Steeves et al. .................. 705/64 |
| 7,802,200 B1 * | | 9/2010 | Siegel et al. .................. 715/811 |
| 7,808,200 B2 * | | 10/2010 | Liu et al. ........................ 318/700 |
| 7,908,223 B2 * | | 3/2011 | Klein et al. ....................... 705/75 |
| 2006/0026246 A1 | | 2/2006 | Fukuhara et al. |
| 2006/0265327 A1 * | | 11/2006 | Rao et al. ......................... 705/40 |
| 2007/0026372 A1 | | 2/2007 | Huelsbergen |
| 2007/0043681 A1 * | | 2/2007 | Morgan et al. .................. 705/67 |
| 2007/0143624 A1 * | | 6/2007 | Steeves ......................... 713/182 |
| 2008/0133348 A1 * | | 6/2008 | Reed et al. ...................... 705/14 |

* cited by examiner

*Primary Examiner* — Calvin L Hewitt, II
*Assistant Examiner* — Zeshan Qayyum
(74) *Attorney, Agent, or Firm* — Wolfe-SBMC

(57) ABSTRACT

Various embodiments of a system and method for in-band transaction verification are described. The system and method for in-band transaction verification may include a transaction verification component. The transaction verification component may be configured to provide a transaction confirmation request that includes one or more machine readable resistant security media objects to indicate one or more transaction details for a transaction as well as a confirmation code for confirming the transaction. The transaction verification component may also be configured to receive a response to the confirmation request, such as a response from the user that submitted the transaction request. If the response includes a response code that is the same as the confirmation code, the transaction verification component may complete the transaction. If the response includes a response code that is different than the confirmation code, the transaction verification component may abort the transaction.

25 Claims, 9 Drawing Sheets

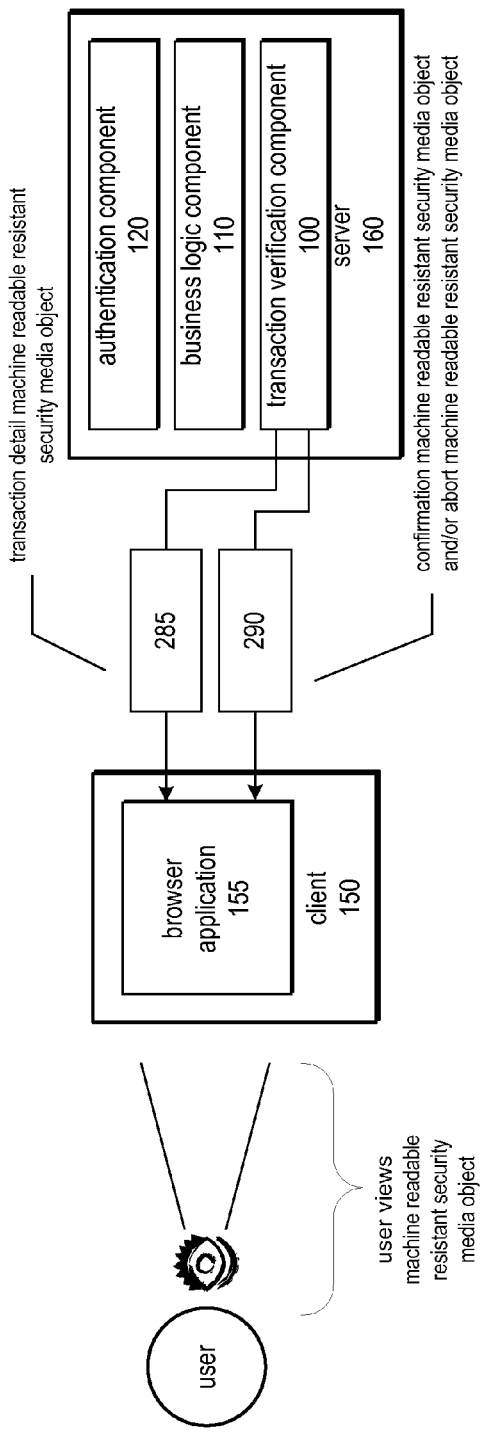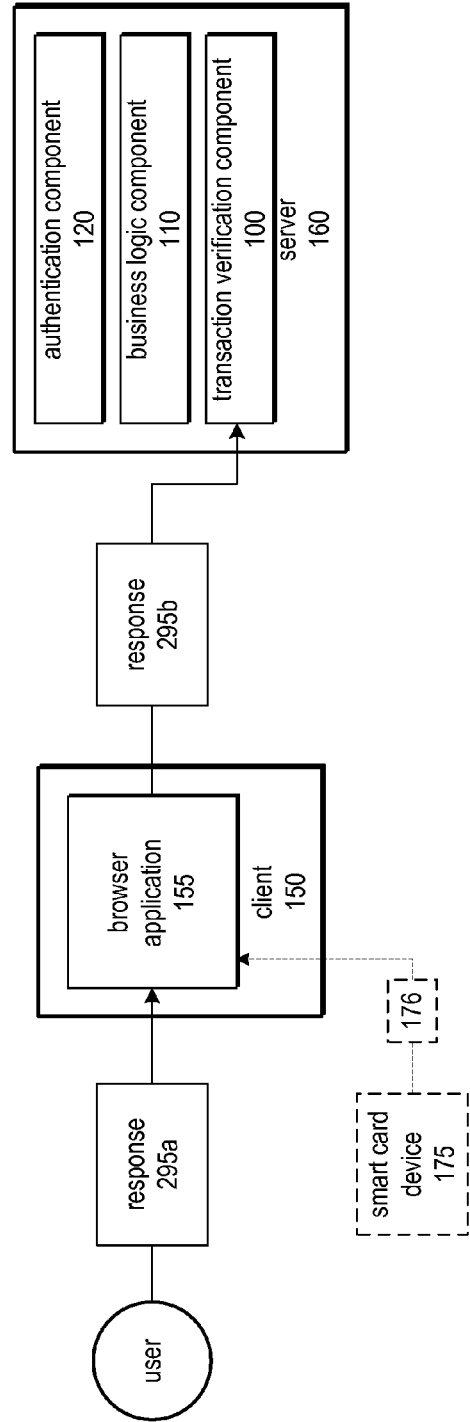

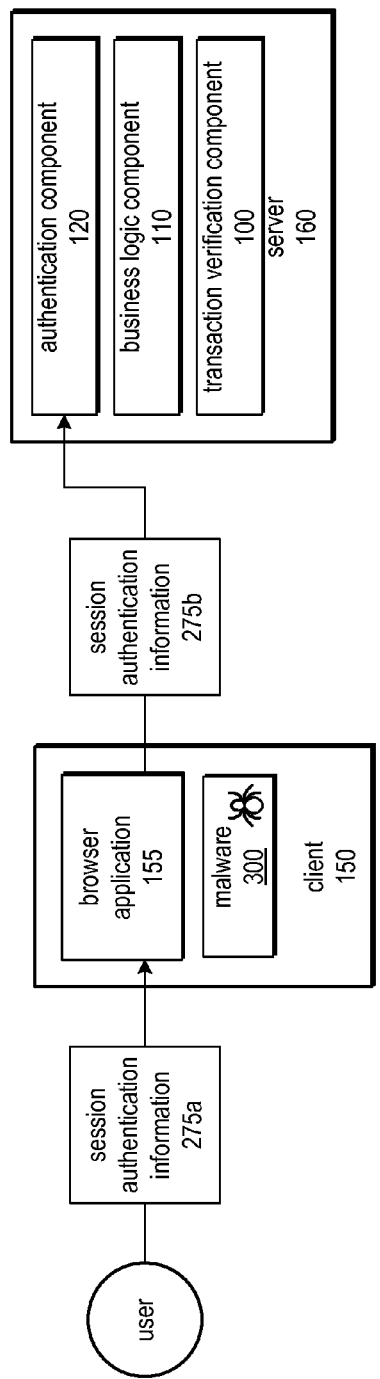
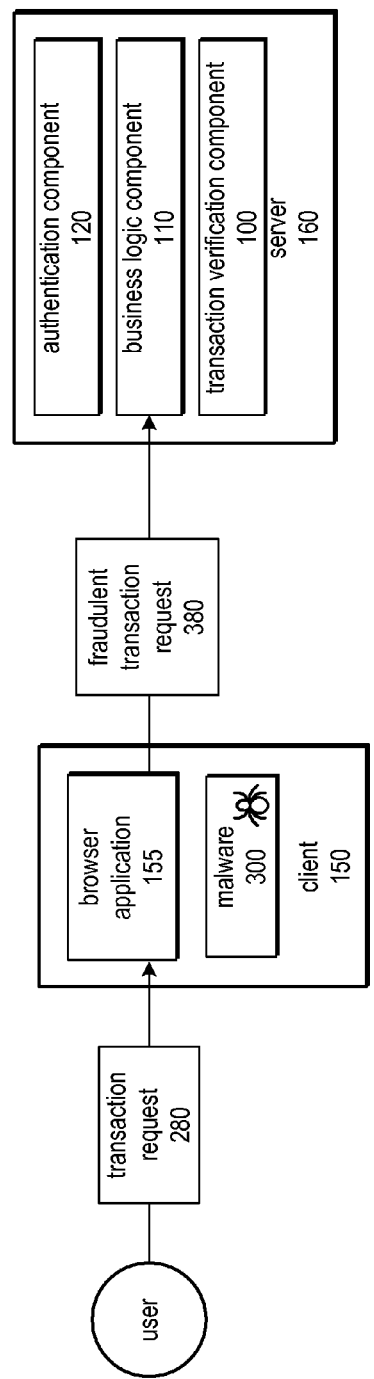
*Figure 3A*
*Figure 3B*

IN-BAND TRANSACTION VERIFICATION

BACKGROUND

1. Field of the Invention

The present invention is directed to computer systems. More particularly, it is directed to verifying the authenticity of transactions within computing environments.

2. Description of the Related Art

Online transactions, such as transactions performed via the Internet and the World Wide Web, have become frequent targets of attacks performed by fraudulent individuals. One such attack is commonly referred to as "phishing." Phishing is performed by "phishers" that attempt to fraudulently acquire sensitive information about a user including, but not limited to, username and password combinations, credit card numbers, addresses, names, personal identification numbers (PINs), and other information that may be used to defraud an individual. One common form of phishing is implemented through electronic mail messages ("emails") that appear to be sent from a credible source. In many cases, a fraudulent email informs a user of an artificial circumstance that requires the user to provide sensitive information, such as a username and password. For example, some emails sent by phishers may indicate that a user's online account has recently undergone upgrades and that the user must provide their username and password to regain access to the account. Such emails may include a hyperlink to a fraudulent webpage that appears to be a legitimate login page of an online account. If an unsuspecting user provides their username and password to the fraudulent webpage, the username and password may be compromised, and the phisher may use the username and password to impersonate the user. When a phisher obtains a username and password of a user's account, they may utilize the account's functionality to perform fraudulent transactions. For instance, a phisher may fraudulently log on to a user's online bank account and perform fraudulent transactions, such as transferring funds from the user's online account to an account controlled by the phisher.

Another type of attack is known as a man-in-the-middle (MITM) attack, in which case an attacker gains the ability to modify communications between a legitimate user's computer system and another computer in such a way that neither computer system gains knowledge of the compromised communications link. For instance, a legitimate user may log on to their online bank account to transfer funds from their checking account to their savings account. To perform such a transaction, various communications may be sent between the legitimate user's computer system and their bank's computer system. A MITM attack may intercept and modify such communications in order to perform fraudulent transactions. For instance, a MITM attack might modify parameters of the transaction, such as the transaction amount or the destination account for the transaction, in order to fraudulently siphon funds away from the transaction participants. In some cases, MITM attacks are performed by "malware," which may include, but is not limited to, computer viruses, worms, Trojan horses, rootkits, backdoors, spyware, botnets, loggers, dialers, and other software designed to infiltrate or damage a computer system. Malware may be used to perform MITM attacks designed to intercept and modify online transactions for the benefit of fraudulent individuals.

Many online accounts (e.g., online bank accounts, online investment accounts, online consumer accounts, etc.) enable users to perform various transactions (e.g., transferring funds between accounts, purchasing one or more items, and/or other transaction related activities). To login to an online account, a user of the account is typically required to provide a username and password or participate in some other type of authentication process. A successful logon typically marks the beginning of a session between the user's computer system and the computer system(s) hosting the online account. Such session is typically terminated when the user logs out of the account or, for security purposes, after a particular period of time has elapsed. To prevent a user from having to re-authenticate (e.g., by repeating the process of providing their user name and password) each time the user navigates to different web pages of their online account, online account websites may provide a session "cookie" (which may in some cases also be referred to as a magic cookie, security key, security token, and/or a session key) to the user's computer system. Typically, the computer systems that host the user account may have knowledge of a unique identifier within the cookie and associate the unique identifier with the user's computer system and/or the session. Since the user's computer system has possession of the cookie during the session, the user may perform various transactions using their account (e.g., transferring funds between accounts, purchasing one or more items, and/or other transaction related activities) without re-authenticating during the session.

The widespread use of cookies for maintaining and managing sessions has contributed to the advancement of a particular type of MITM attack that utilizes a technique called "session hijacking." Session hijacking occurs when malware installed on the user's computer (typically without consent of the user) gains access to a session cookie. This may be referred to as "stealing" the session cookie even though the malware may not necessarily preclude other applications (e.g., the browser that initiated the session) from continuing to use the cookie. By utilizing a stolen session cookie, malware can in some cases bypass the account authentication process required at the account login phases and gain access to the functionality of a user's online account. For instance, the malware may lay dormant until after a user has logged in to their online account and the user's computer system has been issued a session cookie. Accordingly, even in cases where it does not have knowledge of the account authentication information (e.g., a username and password), the malware may use the cookie to perform fraudulent transactions, such as performing a fund transfer to a fraudulent bank account or performing fraudulent purchases.

SUMMARY

Various embodiments of a system and method for in-band transaction verification are described. The system and method for transaction verification may include a transaction verification component configured to verify the authenticity of transaction requests. For instance, the transaction verification component may be configured to receive a request to perform a transaction. For example, the transaction verification component may be configured to receive a request to transfer funds from one account to another account. In some cases, such requests may originate from a user utilizing a browsing application. For instance, the user may utilize a browser application to access one or more online accounts in order to perform transactions.

The transaction verification component may be configured to provide a machine readable resistant security media object to indicate the transaction details for the requested transaction. In various embodiments, the machine readable resistant security media object may be presented to a user through a network-based account. For instance, after a user submits a transaction request through an online account, the machine readable resistant security media object may enable a user to securely view the details of the requested transaction as received by the transaction verification component.

The transaction verification component may be configured to provide an other machine readable resistant security media object that indicates a confirmation code for confirming the transaction. For instance, the transaction verification component may present the other machine readable resistant security media object to the user that submitted the transaction request. In one example, the confirmation code may be used to confirm the transaction details presented in the machine readable resistant security media object described above.

The transaction verification component may be configured to receive a response to the machine readable resistant security media object, such as a response from the user that submitted the transaction request. In some cases, such as if the user confirms the transaction after viewing the machine readable resistant security media object, the response may include a response code that is the same as the confirmation code. In such cases, the transaction verification component may initiate the transaction. If the response does not include a response code that is the same as the confirmation code, the transaction verification component may abort the transaction.

BRIEF DESCRIPTION OF THE DRAWINGS

FIGS. 2A-2D are data flow diagrams illustrating the operation of a transaction verification component, according to one embodiment.

FIGS. 3A-3D are data flow diagrams illustrating the operation of a transaction verification component in the presence of malware, according to one embodiment.

Figure 1:
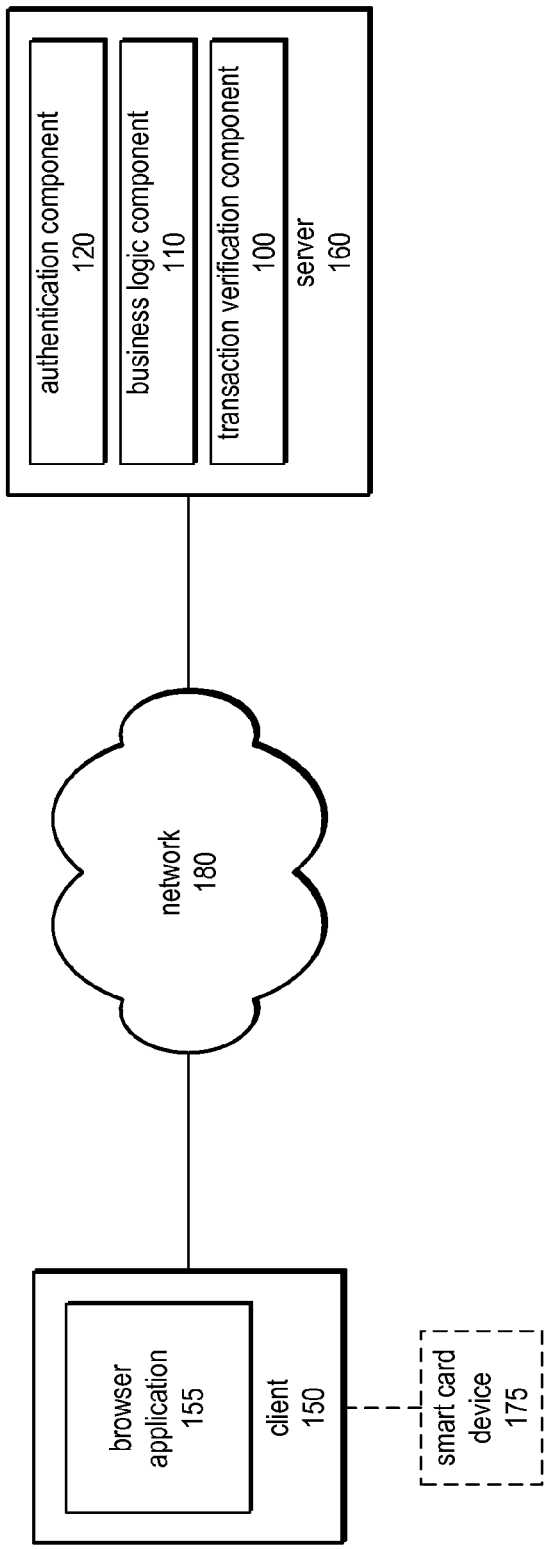
FIG. 1 is a block diagram illustrating an example of a system in which a transaction verification component may be implemented, according to one embodiment.

While the system and method for in-band transaction verification is described herein by way of example for several embodiments and illustrative drawings, those skilled in the art will recognize that the system and method for in-band transaction verification is not limited to the embodiments or drawings described. It should be understood, that the drawings and detailed description thereto are not intended to limit embodiments to the particular form disclosed. The intention is to cover all modifications, equivalents and alternatives falling within the spirit and scope of the system and method for in-band transaction verification as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a system and method for in-band transaction verification are described. The system and method for in-band transaction verification may include a transaction verification component configured to verify the authenticity of electronic transactions, such as transactions performed over one or more networks (e.g., the Internet). The transaction verification component may utilize "machine readable resistant security media objects" to verify the authenticity of a transaction. Machine readable resistant security media objects may include representations of text, images, audio, video, or other representations that indicate a particular piece of information, such as a password, passcode, security phrase, or other security-related information. In some cases, the particular piece of information may include one or more details related to a transaction, such as account identifiers (e.g., origin or destination account numbers), transaction amounts (e.g., a monetary amount). Machine readable resistant security media objects may include distortion such that machine recognition techniques employed to determine the particular piece of information from the machine readable resistant security media object are less effective than machine readable techniques employed to determine the particular piece of information from a media object that indicates the same particular piece of information and does not include such distortion. In various embodiments, the particular piece of information may be a confirmation code for confirming a transaction. In such embodiments, the machine readable resistant security media object may include distortion such that machine recognition techniques for determining the confirmation code from the machine readable resistant security media object are less effective than machine readable techniques for determining the confirmation code from a media object that indicates the same confirmation code without distortion One example of a machine recognition technique may include optical character recognition (OCR). Optical character recognition may include software and/or hardware techniques for determining text-based information (e.g., characters and/or strings of characters) from an image file that contains graphical representations of such text-based information. For example, OCR may be employed to analyze the image file to determine the text characters that are graphically represented by the image. For instance, OCR may compare characteristics of various portions of an image to characteristics of characters (e.g., shape, stroke, size, etc.) from one or more character sets. In some cases, OCR may determine that a particular portion of an image represents a character of a character set. In this way, OCR may convert graphically represented text of one or more image files to machine-editable text, such as text represented by one or more character codes (e.g., ASCII codes).

Accordingly, in some embodiments, machine readable resistant security media objects may include image files that include a particular piece of text-based information as well as distortion. Such objects may be referred to as image-based machine readable resistant security media objects. The distortion may include, for example, random artifacts speckled throughout the image, modifications to the brightness or contrast of one or more portions of the image, blurring of one or more portions of the image, noise added to one or more portions of the image, as well as other visual modifications. In various embodiments, the effectiveness of OCR techniques for determining the particular piece of text-based information when the distortion is present within the image-based machine readable resistant security media object may be less than the effectiveness of the same OCR techniques for determining the particular piece of text-based information when the distortion is not present within the image-based machine readable resistant security media object. For example, the accuracy of OCR techniques when the distortion is present within the image-based machine readable resistant security media object may be less than the accuracy of the same OCR techniques when the distortion is not present within the image-based machine readable resistant security media object. In another example, the amount of processing power (e.g., number of processor cycles and/or executed instructions) required by OCR techniques when the distortion is present within the image-based machine readable resistant security media object may be greater than the amount of processing power required by the same OCR techniques when the distortion is not present within the image-based machine readable resistant security media object. In another example, the amount of processing time (e.g., time to complete text recognition) required by OCR techniques when the distortion is present within the image-based machine readable resistant security media object may be greater than the amount of processing time required by the same OCR techniques when the distortion is not present within the image-based machine readable resistant security media object.

Another example of a machine recognition technique may include speech recognition. Speech recognition may include software and/or hardware techniques for determining text-based information (e.g., characters and/or strings of characters) from an audio file that contains audible representations of such text-based information. For instance, one type of audio file may include a spoken sequence of characters from one or more character sets. For example, speech recognition may be employed to analyze an audio file to determine the text characters that are audibly indicated by the audio file. For example, speech recognition may compare characteristics of various waveforms of an audio file to characteristics of known waveforms for characters of one or more character sets. In some cases, speech recognition may determine that a particular portion of the audio file represents a character of a character set. In this way, speech recognition may convert audible representations of text of one or more audio files to machine editable text, such as text represented by one or more character codes (e.g., ASCII codes).

Accordingly, in some embodiments, machine readable resistant security media objects may include audio files that include a particular piece of information (e.g., spoken text or other audible information) as well as audible distortion. Such objects may be referred to as audio-based machine readable resistant security media objects. The distortion may include, for example, audible noise and/or other audible artifacts configured to obscure the interpretation of the particular piece of information. In various embodiments, the effectiveness of speech recognition techniques for determining the particular piece of information when the distortion is present within the audio-based machine readable resistant security media object may be less than the effectiveness of the same speech recognition techniques for determining the particular piece of information when the distortion is not present within the audio-based machine readable resistant security media object. For example, the accuracy of speech recognition techniques when the distortion is present within the audio-based machine readable resistant security media object may be less than the accuracy of the same speech recognition techniques when the distortion is not present within the audio-based machine readable resistant security media object. In another example, the amount of processing power (e.g., number of processor cycles and/or executed instructions) required by speech recognition techniques when the distortion is present within the audio-based machine readable resistant security media object may be greater than the amount of processing power required by the same speech recognition techniques when the distortion is not present within the audio-based machine readable resistant security media object. In another example, the amount of processing time (e.g., time to complete text recognition) required by speech recognition techniques when the distortion is present within the audio-based machine readable resistant security media object may be greater than the amount of processing time required by the same speech recognition techniques when the distortion is not present within the audio-based machine readable resistant security media object.

In another example, OCR, speech recognition, another machine recognition technique, or some combination thereof may be employed to perform recognition of a particular piece of information from a multimedia file, such as video or animation. Such objects may be referred to as multimedia-based machine readable resistant security media objects. In one example, the above described OCR techniques may be employed upon one or more frames of a multimedia-based machine readable resistant security media object. In another example, the above described speech recognition techniques may be employed on an audio track of the multimedia-based machine readable resistant security media object. Accordingly, in some embodiments, machine readable resistant security media objects may include multimedia-based machine readable resistant security media objects that include a particular piece of information as well as visual-based and/or audio-based distortion. In various embodiments, the effectiveness of machine recognition techniques for determining the particular piece of information when the distortion is present within the multimedia-based machine readable resistant security media object may be less than the effectiveness of the same machine recognition techniques for determining the particular piece of information when the distortion is not present within the multimedia-based machine readable resistant security media object.

In various embodiments, an image-based machine readable resistant security media object may include an image that indicates text that has been distorted such that a human may correctly interpret a code indicated by the text whereas a computer cannot interpret the code without such computer expending a larger amount of computational resources than the computational resources necessary to interpret the code in the absence of such distortion. In various embodiments, the distortions performed on the text may include warping the text, modifying the color of the text, modifying the background of the text (e.g., speckling the background with random artifacts), modifying the brightness or contrast of the text, blurring the text, performing another visual modification of the text, or performing some combination thereof in such a way that preserves human interpretation of the included code while at the same time prevents the code from being interpreted by a computer system or computer application (without such computer expending a larger amount of computational resources than the computational resources necessary to interpret the code in the absence of such distortion). The code that is indicated by the machine readable resistant security media object may include any variety of codes that may be used for security purposes, such as alphanumeric codes of varying lengths. In another example, a machine readable resistant security media object may be a series of images that include a common item. For instance, one type of machine readable resistant security media object may include three images that each graphically illustrate the same item. Each image may also be modified in a similar manner as the modifications described above in regard to text machine readable resistant security media objects. In this example, the name of the common item may serve as the code indicated by the machine readable resistant security media object since it is the common object among the images. In other examples, machine readable resistant security media objects may present video and/or audio as well as distortion in order to graphically and/or audibly indicate a code in such a way that preserves human interpretation of the code while at the same time prevents the code from being interpreted by a computer system or computer application (without such computer expending a larger amount of computational resources than the computational resources necessary to interpret the code in the absence of such distortion).

One example of a machine readable resistant security media object is illustrated by machine readable resistant security media object 520 of FIG. 5. This particular machine readable resistant security media object indicates the code "7LE4GQ353" and also includes distortion that is described in more detail below. Note that a user may simply view the machine readable resistant security media object to determine the code. While a computer system may access the image file of the machine readable resistant security media object, the effectiveness of machine recognition techniques employed by the computer for determining the particular code when the distortion is present within the multimedia-based machine readable resistant security media object may be less than the effectiveness of the same machine recognition techniques for determining the particular code when the distortion is not present within the multimedia-based machine readable resistant security media object. For instance, a computer application (e.g., malware) may attempt to determine the code by using OCR. However, as is the case with machine readable resistant security media object 520, the machine readable resistant security media object may include various distortions to render interpretation via computer systems or applications a time consuming and difficult process. For instance, in the case of machine readable resistant security media object 520, the code that is indicated by the machine readable resistant security media object is distorted through warping and bending of the text. Another modification that may distort the code includes noise (e.g., speckling of random artifacts) applied to the machine readable resistant security media object, such as the noise illustrated on machine readable resistant security media object 520. Another modification that may distort the code is the wavy, horizontal line that extends through each character of the code. Such lines may be implemented to, for example, render OCR techniques ineffective by making it difficult to determine where one character ends and another character begins. In some embodiments, the aforementioned modifications may be performed on the code such that the ability of a computer system to correctly interpret the code is rendered ineffective while at the same time a user may readily interpret the code by viewing the machine readable resistant security media object.

In some embodiments, one or more of the machine readable resistant security media objects described herein may be objects of a "CAPTCHA," which is an acronym for "Completely Automated Public Turing test to tell Computers and Humans Apart," and is a trademark of Carnegie Mellon University. In various embodiments, objects of CAPTCHAs may include images that may indicate a code (e.g., password, passcode, security phrase, or other security-related information) in such a way that differentiates between computers and humans. For instance, a CAPTCHA may present a graphical representation of a code (e.g., an image file that illustrates a code) such that the code is distorted by performing one or more of the following modifications on the code: warping, shrinking, enlarging, twisting, varying the color of characters, modifying brightness, modifying contrast, adding artifacts (e.g., random artifacts or other noise), or other modifications that retain the human readability of the code while at the same time increase the difficulty of interpretation of the code by computer systems and/or applications. Objects of CAPTCHAs may be presented to an entity (e.g., a human or a computer), to differentiate whether such entity is a human or a computer. For instance, if an entity successfully interprets a code that is indicated by the object of the CAPTCHA, the entity may be a human. Similarly, if the entity does not successfully interpret the code that is indicated by the object of the CAPTCHA, the entity may not be human (e.g., a computer and/or application).

The aforementioned transaction verification component may be configured to verify the authenticity of transaction requests. For instance, when a user participates in a transaction over a network, such as a transaction over the Internet, the transaction verification component may present one or more machine readable resistant security media objects to the user as part of a transaction verification process, which may be employed to verify the details of the transaction with the user and/or enable the user to confirm whether the transaction should be processed. One such machine readable resistant security media object may indicate the details of the transaction (e.g., the monetary amount of the transaction, an account identifier of an account from which the funds are being withdrawn, an account identifier of an account to which the funds are being deposited, bank routing numbers of the accounts, and/or other transaction-related details). Presenting the details of the transaction within a machine readable resistant security media object may prevent malware (e.g., computer viruses, worms, Trojan horses, rootkits, backdoors, spyware, botnets, loggers, dialers, and other software designed to infiltrate or damage a computer system) from interpreting the details of the transaction. By preventing the malware from having knowledge of the transaction details, the transaction verification component may prevent the malware from presenting spoofed transaction details to the user as part of a MITM attack.

Another type of machine readable resistant security media object that the transaction verification component may present to the user may be a machine readable resistant security media object that indicates a transaction confirmation code and/or a machine readable resistant security media object that indicates a transaction abort code. In various embodiments, the transaction confirmation code and/or the transaction abort code may be unique to the account details indicated to the user via the machine readable resistant security media object described above. In this way, even were malware to, e.g., steal a session cookie and successfully submit a fraudulent transaction request, the malware may be prevented from determining the correct confirmation code for the transaction thereby preventing the fraudulent transaction from being processed.

An example of a system in which transaction verification component may be implemented is illustrated by the block diagram of FIG. 1. In various embodiments, a system configured to request that a transaction be performed, such as client 150, may send a transaction request to a system configured to service such requests (e.g., by initiating, completing and/or performing the transactions), such as server 160. A transaction may include, but is not limited to, transferring funds from one account to another account (including, but not limited to, bank accounts, investment accounts, retirement accounts, and other accounts configured to hold monetary funds), performing a purchase (e.g., transferring monetary funds to a merchant that provides one or more items for purchase), or performing some other type of action that includes the transfer or exchange of monetary funds. Client 150 and/or server 160 may be a variety of computer systems including, but not limited to, desktop or laptop computer systems, server computer systems, handheld computing devices, mobile telephones, smartphones, personal digital assistants, or another device configured to execute program instructions via one or more processors. As used herein, the terms 'client' and 'server' pertain to the aforementioned transactional relationship between client 150 and server 160 (e.g., server 160 services transaction requests submitted by client 150); no other relationship is necessarily implied by the terms 'client' and 'server.' For example, in various embodiments, client 150 and server 160 may be computer systems other than systems adhering to a traditional client-server relationship. In one embodiment, client 150 and server 160 may be peer nodes in a peer-to-peer networking environment. In other embodiments, client 150 may be a computer system configured to enable a user to browse the World Wide Web and server 160 may be a web server. Additionally, client 150 and server 160 may communicate over a network, such as network 180. In various embodiments, network 180 may be a Local Area Network (LAN), Wide Area Network (WAN) (e.g., the Internet), an other type of network configured to transfer data between computer systems, and/or some combination thereof.

While server 160 is illustrated as a single computer system, in some embodiments, the functionality of server 160 may be implemented through multiple computer systems. For instance, server 160 may be implemented using multiple computer systems that adhere to a three tier architecture including, but not limited to, a front end tier (e.g., web servers configured to serve web content), a middle tier (e.g., application servers configured to perform business logic and other processing tasks), and a back end tier (e.g., databases that manage and provide access to stored data). In some embodiments, each component of server 160 (e.g., authentication component 120, business logic component 110, and transaction verification component 100) may be implemented by separate computer systems.

In the illustrated embodiment, client 150 may be configured to execute a browser application, such as browser application 155. Browser application 155 may be a web browser or other application configured to display web content, such as Microsoft Internet Explorer™, Netscape Navigator™, Mozilla Firefox™, or any application that is capable of accessing and displaying documents or web pages, such as according to the Hypertext Transport Protocol (HTTP). Browser application 155 may (e.g., in response to user input) access content from server 160. The content provided by server 160 may include one or more web pages, such as web pages of one or more user accounts including, but not limited to, bank accounts, credit accounts, investment accounts, retirement accounts, and/or customer accounts. Access to such accounts may be protected and/or managed by authentication component 120. For instance, in one embodiment, to access an account provided by server 160, browser application 155 may be required to provide authentication information (e.g., a username and password or other authentication information) to authentication component 120. In various embodiments, authentication component 120 may be configured to support user authentication via a digital certificate, such as through the digital certificate arrangement used in public key infrastructure (PKI). If the authentication information provided to the authentication component is correct, the authentication component may begin a session with the browser and provide the browser (and thus the user of the browser) access to the particular account for the duration of the session. For instance, the authentication component may issue a cookie or other security token that the browser may use to communicate with server 160.

While a session is active, business logic component 110 may be configured to provide various account functionality, such as the ability to perform one or more transactions, for the accounts provided by server 160. The business logic component may be configured to receive transaction requests from browser 155 and initiate and/or perform the transaction if the transaction request is confirmed by transaction verification component 100 as described in more detail below. In some embodiments, the business logic component may forward all transaction requests to the transaction verification component. In other embodiments, the business logic component may use anomaly detection techniques to selectively forward transaction requests to the transaction verification component. For instance, in one embodiment, the business logic component may forward requests that indicate an amount of funds that is larger than a security threshold that indicates a particular amount of funds. This security threshold may be set by, e.g., a system or security administrator. In another example, the business logic component may forward requests that indicate a destination account that is known by the server to be fraudulent. In another example, the business logic component may forward requests that indicate destination accounts residing in countries that are known to have a large amount of fraudulent activity.

When business logic component forwards a transaction request, such as a request for transferring a particular amount of money from one bank account to another, to the transaction verification component, the business logic component may provide details of the transaction to the transaction verification component. In one example, the transaction details may indicate "You have chosen to transfer $500.00 from account 2323543 to account 84720380." The transaction verification component may create a machine readable resistant security media object that indicates the transaction details including, but not limited to, one or more parties involved in the transaction, a monetary amount for the transaction (e.g., the amount of funds being transferred), an account identifier of an account from which the funds are originating, an account identifier of an account to which the funds are being deposited, and/or bank routing numbers of the accounts, as well as other details related to the particular transaction. The aforementioned machine readable resistant security media object that is configured to indicate the transaction details may be referred to herein as a "transaction detail machine readable resistant security media object."

The transaction detail machine readable resistant security media object may be provided by transaction verification component 100 to browser application 155 for interpretation by the user of the browsing application as part of a transaction verification process. The transaction verification process may be implemented by transaction verification component 100 to verify the authenticity of the particular transaction request (i.e., verify that the particular verification request was submitted and/or approved by the user) such that fraudulent transaction requests may be discarded and legitimate transaction requests may be processed. Presenting a transaction detail machine readable resistant security media object to the user may prevent malware existing on client 150 from intercepting the transaction details since the malware may not be able to interpret the transaction details that are indicated by the transaction detail machine readable resistant security media object. Accordingly, the user may be confident that the details indicated by the transaction detail machine readable resistant security media object are the same as the transaction details that server 160 may use (if the user indicates that the transaction should be confirmed) to initiate the transaction, as described in more detail below.

To prevent a malware application from submitting a fraudulent transaction request and "silently" confirming such request (e.g., confirming the request without providing knowledge of such action to the user), the transaction verification component may request a user to provide a confirmation code to the transaction verification component in order to initiate and/or perform the requested transaction. To provide the user with the correct confirmation code while also preventing malware from interpreting the confirmation code, the transaction verification component may provide a "confirmation machine readable resistant security media object," which may be a machine readable resistant security media object that indicates the correct confirmation code for the particular transaction request, to the user via the browser application. The user may interpret the confirmation code by viewing the confirmation machine readable resistant security media object. The user may then submit a "response code" (e.g., the code that the user indicates is the correct confirmation code after interpreting the confirmation machine readable resistant security media object) through the browser application to transaction verification component 100. The transaction verification component may determine whether the response code provided by the user is the same as the confirmation code indicated by the confirmation machine readable resistant security media object. If the response code and the confirmation code are the same, the transaction verification component may initiate and/or perform the transaction. For instance, in some embodiments, server 160 may itself include logic to perform a transaction. In other embodiments, the transaction verification component may indicate to another computer system that the transaction should be initiated (e.g., by sending requests or commands via network 180 to a computer system of a financial institution configured to process transactions). Additionally, if the response code and the confirmation code are not the same, the transaction verification component may abort the transaction. For instance, in some embodiments, the transaction verification component and/or the server may simply refrain from processing the transaction. In other embodiments, such as when another computer system is actually responsible for performing the transaction, the verification component and/or server 160 may actively abort the transaction. For instance, the transaction verification component and/or the server may send an abort command to the computer system configured to perform the transaction.

In various embodiments, the confirmation machine readable resistant security media object may be matched to a particular transaction detail machine readable resistant security media object; for example, a particular confirmation machine readable resistant security media object may in some cases only be valid for confirming the particular transaction for which the particular transaction detail machine readable resistant security media object was generated. For instance, for a particular transaction detail machine readable resistant security media object provided to the user through the browser application, the transaction verification component may in some cases only initiate a transaction if the user provides a particular confirmation code that corresponds to the particular transaction detail machine readable resistant security media object. In this manner, the user may be confident that, by providing the confirmation code indicated by the confirmation machine readable resistant security media object, he is not inadvertently confirming some other transaction request, such as a fraudulent transaction request submitted by malware.

In some embodiments, the transaction verification component may enable a user to provide an abort code to the transaction verification component in order to abort the requested transaction. To provide the user with the correct abort code while also preventing malware from interpreting the abort code, the transaction verification component may provide an "abort machine readable resistant security media object," which may be a machine readable resistant security media object that indicates the correct abort code for the particular transaction request, to the user via the browser application. The user may interpret the abort code by viewing the abort machine readable resistant security media object. The user may then submit a response code through the browser application to transaction verification component 100. The transaction verification component may determine whether the response code provided by the user is the same as the abort code indicated by the abort machine readable resistant security media object. If the response code and the abort code are the same, the transaction verification component may abort the transaction. For security purposes, the transaction verification component may in some embodiments automatically abort a transaction if a response code has not been received from a user within a particular amount of time after the transaction detail machine readable resistant security media object has been provided to the user.

In various embodiments, client 150 may also be configured with a smart card device such as smart card device 175. In some embodiments, smart card device 175 may include a memory medium, which is accessible to client 150, that securely stores one or more secret keys (e.g., encrypted security keys) for use during authentication with server 160. One example of such a device might include a security dongle. In some embodiments, smart card device 175 may be configured to read one or more secret keys from a smart card, which may be a separate item or device that includes a memory medium that stores one or more secret keys for use during authentication with server 160. One example of such a device might include a smart card reader. Additionally, browser application 155 may be configured to access secret keys from smart card device 175 and/or secret keys from smart cards to which smart card device 175 is coupled. Browser application 155 may be configured to use such keys for authentication with server 160, such as during an account login process. In some embodiments, browser application 155 may utilize one or more secret keys form smart card device 175 to digitally sign user responses to the machine readable resistant security media objects, which are sent to server 160.

Figure 2A:
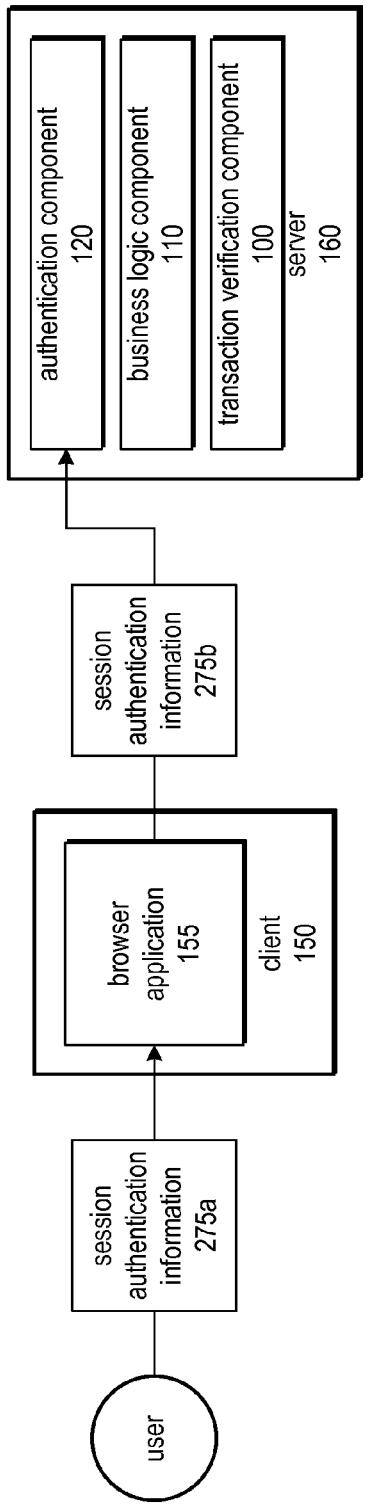
Figure 2B:
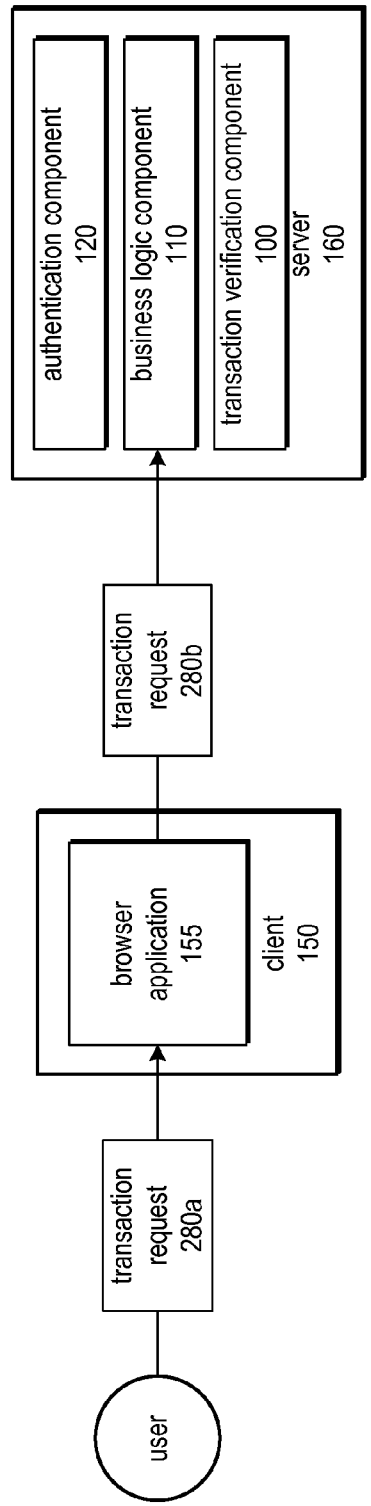

FIGS. 2A-2D illustrate data flow diagrams illustrating the operation of a system including a transaction verification component, according to some embodiments. As illustrated in FIG. 2A, to login to a user account (including, but not limited to, bank accounts, investment accounts, retirement accounts, and other accounts configured to hold monetary funds) browser application 155 may receive session authentication information, such as session authentication information 275a, from a user. Such session authentication may include usernames, passwords, security codes, and/or other information for authenticating a user for account access. As demonstrated by the illustrated embodiment, the browser application may be configured to provide such authentication information to server 160, as illustrated by authentication information 275b. In some cases, session authentication information 275a and authentication information 275b may be the same (e.g., browser 155 may directly forward such information to server 160). In other cases, the browser application may modify or replace one or more portions of the authentication information before providing it to server 160 as session authentication information 275*b*, such as by encrypting or performing other security measures on the authentication information.

Authentication component 120 may receive session authentication information 275 from client 150 and determine, based on the session authentication information, whether the user should be granted access to an account. For instance, the authentication component may determine if a username matches an account provided by server 160. The authentication component may also determine whether a password of the session authentication information matches the username. If the username and password match each other, the authentication component may provide the user with access to their account. If the username and password do not match each other, the user may be denied access to their account. Server 160 may store records (e.g., in a database of records) that indicate matching username and password pairs. One skilled in the art will recognize other techniques for authenticating a user for account access may be employed. It is intended that various embodiments may employ such techniques, whether presently known or developed in the future. In some embodiments, the successful authentication of a user may begin an account session, during which the user may access various account functions, as described below.

After the user has been successfully authenticated by the authentication component, the user may utilize various functionalities of their account. For instance, the user may transfer funds between accounts, purchase one or more items, and/or perform other transaction related activities. To perform a transaction, the user may submit a transaction request, as illustrated by transaction request 280*a* of FIG. 2B. The transaction request may indicate, for example, a monetary amount of funds to transfer, an origination account for the transfer (e.g., where the funds should be debited from), and/or a destination account for the transfer (e.g., where the funds should be deposited to), as well other transaction-related parameters (e.g., a scheduled date and time to perform the transaction). Browser application 155 may be configured to provide the transaction request to business logic component 110 of server 160, as illustrated by transaction request 280*b*. In some cases, transaction request 280*a* and transaction request 280*b* may be the same (e.g., browser application 155 may forward the message to server 160). In other cases, the browser application may modify the transaction request before providing it to server 160 as transaction request 280*b*, such as by encrypting or performing other security measures on the transaction request.

Business logic component 110 may be configured to determine the various transaction-related parameters (e.g., amount of funds to transfer, origination account, destination account, etc.) from the transaction request and initiate and/or perform the requested transaction according to the request. Before the business logic component performs and/or initiates the requested transaction, transaction verification component 100 may verify the authenticity of the particular request with the account user. In this way, the transaction verification component may prevent fraudulent transaction requests from being processed. As illustrated in FIG. 2C, to verify the authenticity of the particular request, the transaction verification component may provide browser application 255 (and thus the user) with various machine readable resistant security media objects. As illustrated by machine readable resistant security media object 285, one type of machine readable resistant security media object that the transaction verification component may provide to the browser application is a transaction detail machine readable resistant security media object, such as the transaction detail machine readable resistant security media objects described above. A transaction detail machine readable resistant security media object may indicate the details of the transaction including, but not limited to, one or more parties involved in the transaction, a monetary amount for the transaction (e.g., the amount of funds being transferred), an account identifier of an account from which the funds are originating, an account identifier of an account to which the funds are being deposited, and/or bank routing numbers of the accounts, as well as other details related to the particular transaction. As illustrated by machine readable resistant security media object 290, another type of machine readable resistant security media object that the transaction verification component may provide to the browser application is a confirmation machine readable resistant security media object, such as the confirmation machine readable resistant security media objects described above. A confirmation machine readable resistant security media object may indicate (to the user via the browser application) the correct confirmation code for the particular transaction request. In some cases, machine readable resistant security media object 290 may also, or alternatively, include an abort machine readable resistant security media object, such as the abort machine readable resistant security media objects described above.

Note that machine readable resistant security media objects 285 and 290 may in various embodiments be combined into a single machine readable resistant security media object. For instance, in one embodiment, a single machine readable resistant security object may be used to present one or more transaction details as well as a confirmation code to the user. In other cases, additional (e.g., three or more) machine readable resistant security media objects may be used to present one or more transaction details as well as a confirmation code to the user.

As illustrated in FIG. 2C, the user may view and interpret the information presented by machine readable resistant security media objects 285 and 290. By presenting such information in the form of machine readable resistant security media objects, the transaction verification component may prevent malware from interpreting and/or spoofing (e.g., modifying) the information provided to the user. In various embodiments, machine readable resistant security media object 290 may include a confirmation code and or abort code. As illustrated by FIG. 2D, depending on whether the user would like to confirm the transaction or abort the transaction, the user may input to browser application 155 a response code (e.g., through an input device, such as a keyboard or pointing device) that is the same as the confirmation code or the abort code, respectively. Such response is illustrated as response 295*a*, which browser application 155 may provide to the transaction verification component as response 295*b*. In some cases, response 295*a* and response 295*b* may be the same. In other cases, the browser application may modify the response before providing it to server 160 as response 295*b*, such as by encrypting or performing other security measures on the transaction request. The portion of response 295*a* that is provided by the user may be referred to as the response code. For a particular transaction request, the transaction verification component may determine whether the response code is the same as the confirmation code and/or the abort code. If the response code is the same as the confirmation code, the transaction verification component may initiate and/or perform the requested transaction. If the response code is the same as the abort code, the transaction verification component may abort the transaction. In some embodiments, if a particular amount of time has elapsed since presentation of the transaction detail machine readable resistant security media object to the user, the transaction verification component may be configured to automatically abort the transaction. In some cases, if the response code matches neither the confirmation code nor the abort code, the transaction verification component may by default abort the transaction.

In some embodiments, response 295a may be digitally signed using a secret key, such as secret key 176, accessed from a smart card device, such as smart card device 175. In some cases, the secret key may be stored on a memory of the smart card device. For instance, the smart card device may serve as a security dongle. In other cases, the secret key may be stored on the memory of a smart card that may be coupled to the smart card device. For instance, the smart card device may be a smart card reader comprising an input configured to read security keys from smart cards. When the transaction verification component receives a response (e.g., response 295b) that has been digitally signed, the transaction verification component may confirm that such response was signed by the actually account holder. For instance, the transaction verification component may verify that the digital signature is valid for the particular user and/or account. If the digital signature of the response is invalid, the transaction verification component may abort the respective transaction. Accordingly, through the use of the aforementioned machine readable resistant security media objects and digitally signed user responses, the transaction verification component may provide a secure method for preventing malware from submitting fraudulent transaction requests.

In various embodiments, the communications between browser application 155 and server 160 may occur through the same communication channel. Such communications may include, but are not limited to, session authentication information (e.g., session authentication information 275a or 275b), transaction requests (e.g., transaction request 280a or 280b), machine readable resistant security media objects (e.g., machine readable resistant security media object 285 and/or machine readable resistant security media object 290), as well as responses (e.g., response 295a or 295b). When such communications are implemented within the same communication channel (e.g., through the Internet, through a single account session, or through another communication channel), as is the case in some embodiments, the communications may be referred to as "in-band" communications.

FIGS. 3A-3D include data flow diagrams that illustrate the operation of the transaction verification component in the presence of malware, according to one embodiment. The elements of FIGS. 3A-3D may be substantially similar to the like numbered elements of FIG. 2A-2D. Note that, in FIG. 3A, the client computer system has been infected by malware 300. Malware may in some cases be configured to perform a session hijack or other malicious attack on the client computer system and/or an account provided by server 160. During a session hijack, the malware may refrain from interfering with the session authentication process. However, once the user has been properly authenticated, malware 300 may in some cases utilize cookies and/or other security items provided to the client computer from authentication component 120 in order to communicate "silently" (e.g., with out the user's and/or the server's knowledge) with server 160.

As illustrated by FIG. 3B, the user may submit a transaction request in a similar manner as described above with respect to FIG. 2B. Note that in this case, malware 300 may intercept the transaction request and submit a different, fraudulent transaction request, as illustrated by fraudulent transaction request 380. The fraudulent transaction request may attempt to, for example, divert funds away from the user's account into a fraudulent bank account. For instance, if the user were attempting to transfer funds from their checking account to their savings account, the malware may modify such a request by replacing the account and routing numbers of the destination account (e.g., the savings account) with fraudulent account and routing numbers.

Figure 3C:
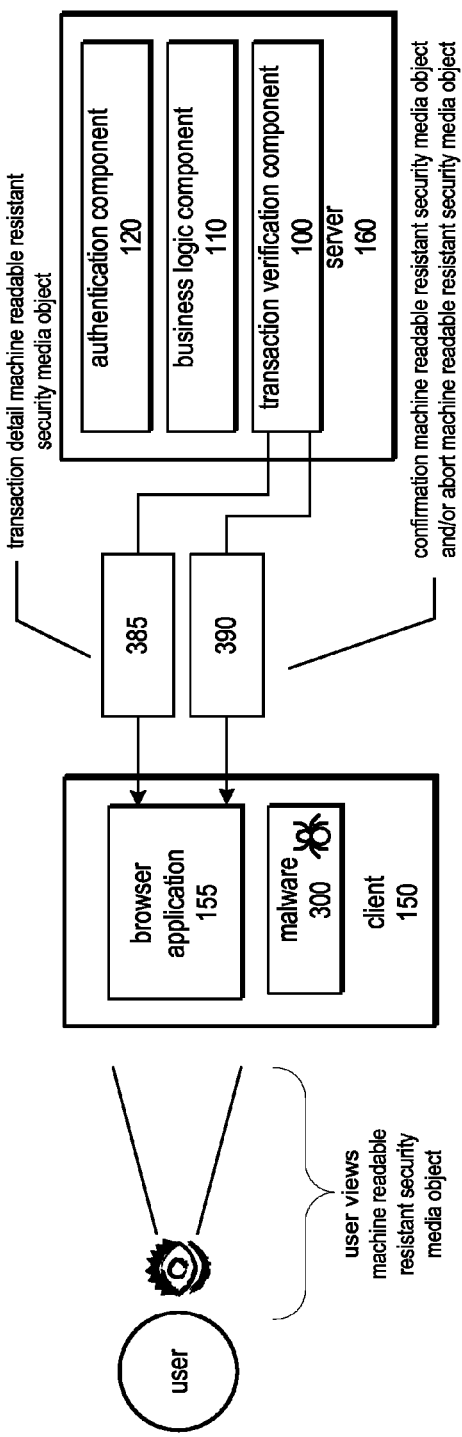

In this case, as illustrated by FIG. 3C, since server 160 received a fraudulent transaction request, transaction detail machine readable resistant security media object 385 may indicate to the user the transaction details of the fraudulent transaction request instead of the transaction details of the transaction request submitted by the user. Thus, the user may recognize that the transaction details for the current transaction request have been compromised. Accordingly, after viewing machine readable resistant security media object 390, which may indicate a confirmation code and/or an abort code, the user may submit the abort code to prevent the fraudulent transaction from being carried out, as illustrated by response 395a. In some embodiments, the user may simply refrain from responding and the transaction verification component may be configured to automatically abort the transaction after failing to hear a response for a particular time period.

Figure 3D:
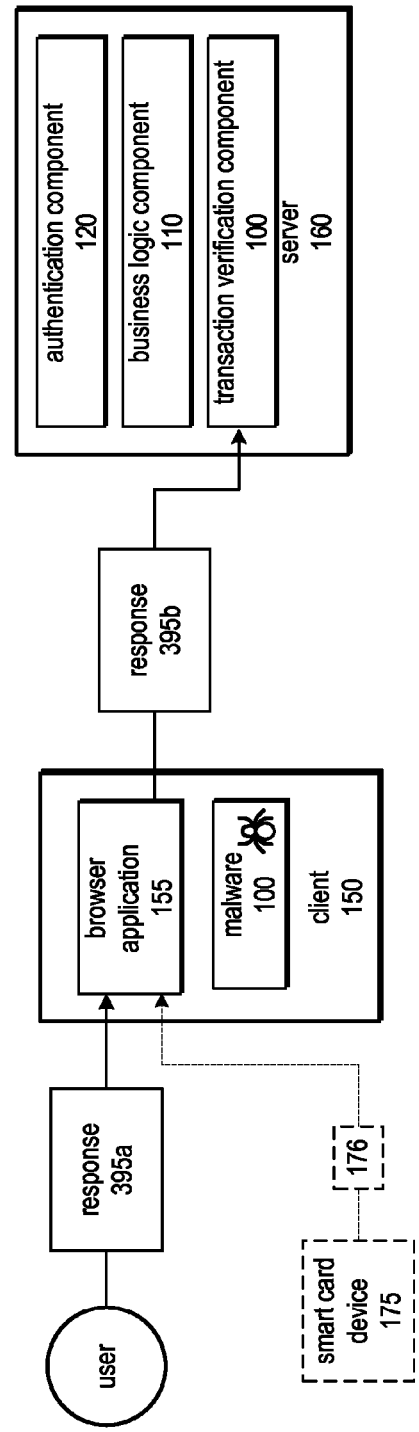

As illustrated by FIG. 3D, browser application 155 may receive the response code from the user, as illustrated by response 395b, and provide the response code to the transaction verification component. As demonstrated above, this response may include an abort code submitted by the user (as interpreted from the machine readable resistant security media object 390). When transaction verification component 100 receives response 395b, the transaction verification component may abort the transaction since, in this case, response 395b includes the abort code submitted by the user. By using the aforementioned machine readable resistant security media objects and digitally signed user responses, the transaction verification component may effectively thwart fraudulent transaction requests from malware or other malicious software. Note that in some embodiments, response 395a and response 395b may be the same (e.g., browser application 155 forwards the response to server 160). In other cases, the browser application may modify the response before providing it to server 160 as response 395b, such as by encrypting or performing other security measures on the response.

Figure 4:
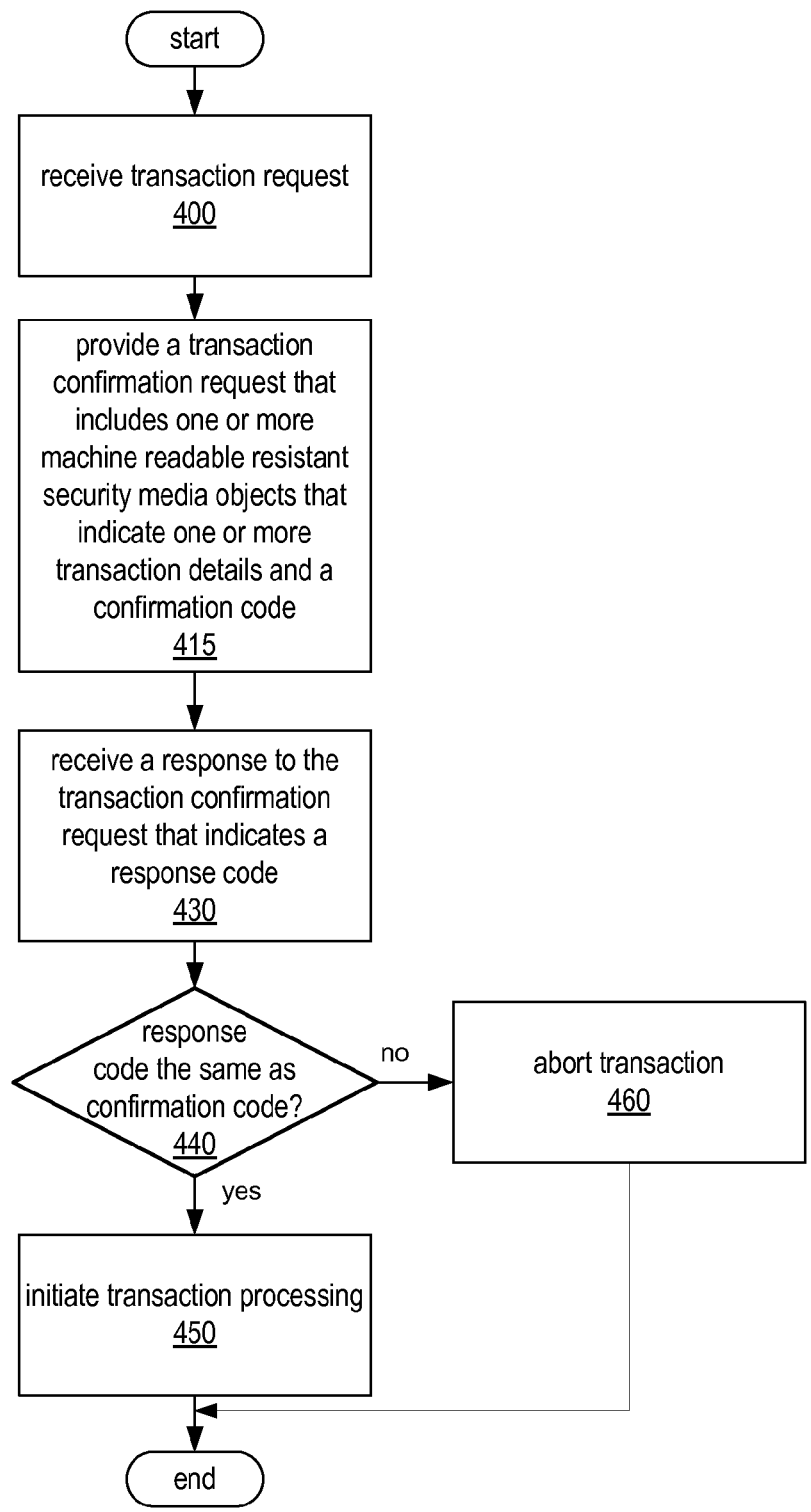
FIG. 4 is a flowchart that illustrates a method for verifying the authenticity of a transaction request, according to one embodiment.

FIG. 4 illustrates a flowchart of a method for verifying the authenticity of a transaction verification request, according to one embodiment. In various embodiments, the transaction verification component (e.g., transaction verification component 100) may be configured to perform the method described herein. As illustrated by step 400, the method may include receiving a transaction request. As demonstrated above, transaction request may include, but is not limited to, requests for transferring funds from one account to another account (including, but not limited to, bank accounts, investment accounts, retirement accounts, and other accounts configured to hold monetary funds), performing a purchase (e.g., transferring monetary funds to a merchant that provides one or more items for purchase), or performing some other type of action that includes the transfer or exchange of monetary funds. In various embodiments, receiving a transaction verification request may include receiving such a request from a browser application or other application configured to provide requests over a network, such as the Internet.

As illustrated by block 415, the method may include providing a transaction confirmation request that includes one or more machine readable resistant security media objects that indicate the one or more details of the transaction for the particular transaction request. The method may include providing the machine readable resistant security media object to a browser application and/or a user of the browser application. Such machine readable resistant security media object may indicate the details of the transaction (e.g., the monetary amount of the transaction, an account identifier of an account from which the funds are being withdrawn, an account identifier of an account to which the funds are being deposited, bank routing numbers of the accounts, and/or other transaction-related details). Presenting the details of the transaction within a machine readable resistant security media object may prevent malware (e.g., computer viruses, worms, Trojan horses, rootkits, backdoors, spyware, botnets, loggers, dialers, and other software designed to infiltrate or damage a computer system) from interpreting the details of the transaction. By preventing the malware from having knowledge of the transaction details, the method may prevent the malware from presenting spoofed transaction details to a user as part of a MITM attack. The machine readable resistant security media object provided in this step may in some cases be the same as the transaction detail machine readable resistant security media object described above. Also illustrated by block 415, one or more of the machine readable resistant security media objects may include a confirmation code. The method may include providing the machine readable resistant security media object to a browser application and/or a user of the browser application. Such machine readable resistant security media object may be a machine readable resistant security media object that indicates a correct confirmation code for the particular transaction request, to the user via the browser application. By providing the confirmation code via a machine readable resistant security media object, the method may ensure that malware or other malicious software may not be able interpret the code and use the code to fraudulently confirm a transaction request.

As illustrated by block 430, the method may include receiving a response to the transaction confirmation request that includes a response code (e.g., the code that the user indicates is the correct confirmation code after interpreting the confirmation machine readable resistant security media object). Such response may be receive through, for example, the browser application described above. As illustrated by step 440, the method may include determining whether the response code provided by the user is the same as the confirmation code indicated by the confirmation machine readable resistant security media object. As illustrated by the positive output of step 440, if the response code and the confirmation code are the same, the method may include initiating, completing and/or performing the transaction, as illustrated by block 450. For instance, in some embodiments, server 160 may itself include logic to perform a transaction. In another example, the method may include the transaction verification component indicating to another computer system that the transaction should be initiated (e.g., a by sending requests or commands via network 180 to a computer system of a financial institution configured to process transactions). Additionally, if the response code and the confirmation code are not the same, the method may include aborting the transaction, as illustrated by block 460. For example, in some embodiments, the method may include the transaction verification component and/or the server refraining from processing the transaction. In other embodiments, such as when another computer system is actually responsible for performing the transaction, the method may include the verification component and/or server 160 actively aborting the transaction. For instance, the method may include the transaction verification component and/or the server sending an abort command to the computer system that is configured to perform the transaction.

In some embodiments, in addition to a machine readable resistant security media object that indicates a confirmation code, the method may also include providing a machine readable resistant security media object that indicates an abort code, such as providing a machine readable resistant security media object that indicates an abort code to a user via a browser application. This abort code may in some cases be submitted by a user to abort a transaction (e.g., by submitting the abort code as a response to a transaction verification component), such as a transaction that the user deems to be fraudulent. Accordingly, in some embodiments, step 440 may include determining if the response code is the same as the abort code. If the response code is the same as the abort code, the method may include aborting the transaction. For instance, the method may include sending an abort command to a computer system that is tasked with carrying out the particular transaction (e.g., the computer system of a bank or other financial institution).

Figure 5A:
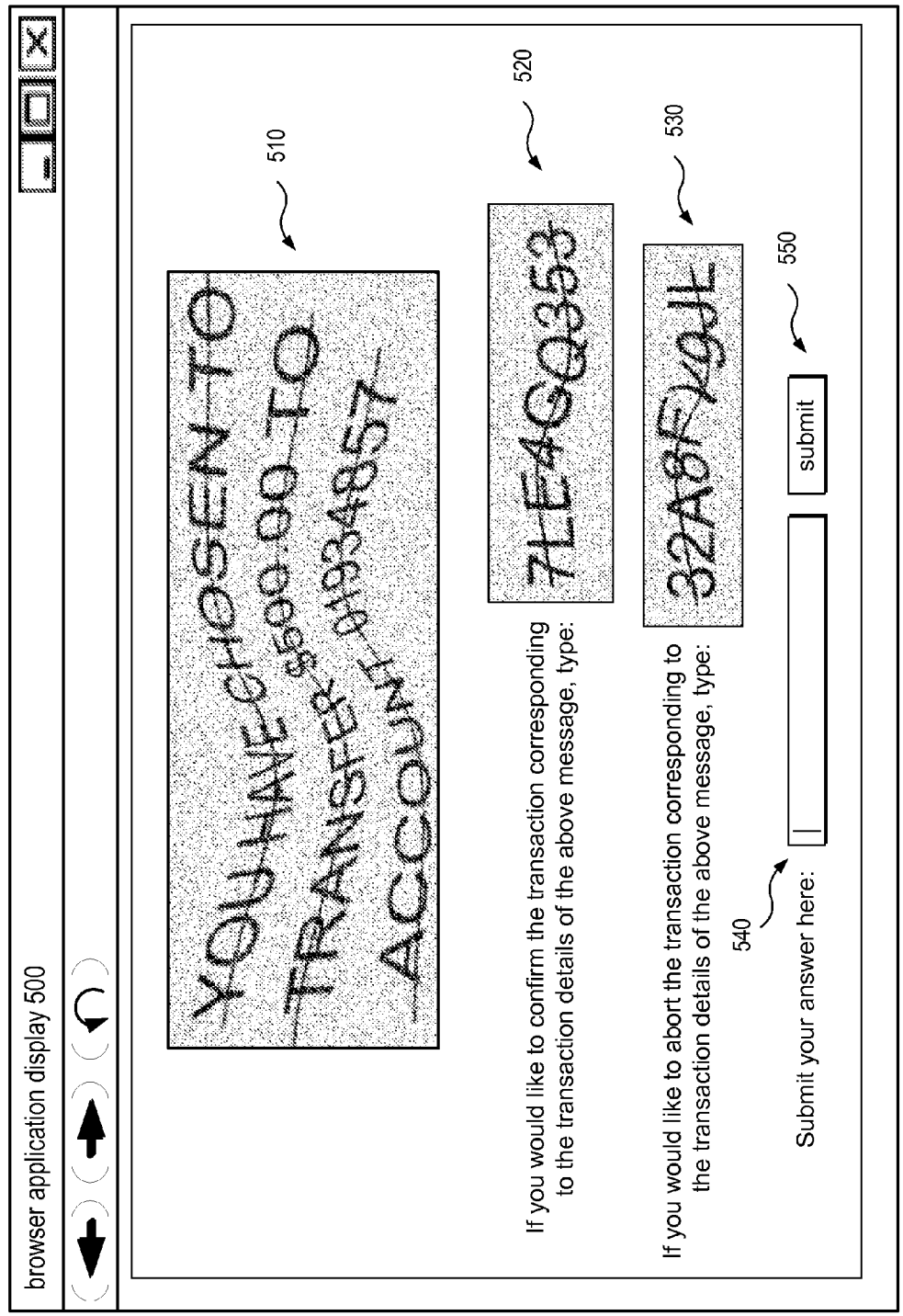
FIGS. 5A-5B illustrate examples of a display for verifying the authenticity of a transaction request, according to some embodiments.

FIG. 5A illustrates an example of a browser application display, which includes multiple machine readable resistant security media objects, according to some embodiments. This display may in various embodiments be generated by a transaction verification component, such as transaction verification component 100 described above, and provided to browser application 155 to be viewed by a user. Browser application display 500 may in some embodiments be a display of a web browser application that is configured to access one or more accounts from a server, such as server 160 described above. In various embodiments, the illustrated display may be presented to a user after the user (or, alternatively, a fraudulent individual) submits a transaction request. As demonstrated in the illustrated embodiment, the display includes transaction detail machine readable resistant security media object 510, which indicates details for the request transaction. In the illustrated embodiment, these transaction details include a transaction amount (e.g., an amount of funds to be transferred) and the account identifier (e.g., account number) of the account to which the funds are being sent. In other embodiments, other transaction details (e.g., origination account identifiers, routing numbers, account holder names, etc.) may also be included. As described above, providing the transaction details within a machine readable resistant security media object may prevent malware from interpreting and/or modifying the details. For instance, in the illustrated embodiment, the transaction detail machine readable resistant security media object indicates that "You have chosen to transfer $500.00 to account 01934857." However, as described above, malware may be unable to determine such details from the machine readable resistant security media object.

The display may also include a confirmation machine readable resistant security media object that indicates a confirmation code, such as confirmation machine readable resistant security media object 520. In the illustrated embodiment, the confirmation code is the alphanumeric code "7LE4GQ353." However, in other cases, other code formats may be employed. The user may submit this code if they agree with the transaction details presented within the transaction detail machine readable resistant security media object. The display may also include an abort machine readable resistant security media object that indicates an abort code, such as abort machine readable resistant security media object 530. In the illustrated embodiment, the abort code is the alphanumeric code "32A8FY9JL." However, in other cases, other code formats may be employed. The user may submit this code if they disagree with the transaction details presented within the transaction detail machine readable resistant security media object. In this way, the user may prevent a fraudulent transaction, such as a transaction associated with a transaction request that is submitted by malware. In some cases, the presentation of an abort machine readable resistant security media object may be optional as the server side logic (e.g., transaction verification component) may be configured to automatically abort a transaction if it has not received a response from a user within a particular time period. Once the user has determined which code they will submit (e.g., dependent on whether the user wants to confirm or abort the transaction), the user may input (e.g., via keyboard and/or pointing device) the respective code into text entry field 540 and submit the entered code by selecting submit button 550. This response may in some embodiments be the same as response 295 described above. In various embodiments, the response submitted through the browser application display may be used by transaction verification component 100 to verify the authenticity of a transaction or abort a transaction, as indicated by the user's submitted response code.

In various embodiments, the location of information (e.g., transaction details, confirmation codes, and/or abort codes) within a machine readable resistant security media object may be randomized across multiple transactions. For instance, the location of transaction details within machine readable resistant security media object 510 may be randomized across different transaction requests. In other words, for each of multiple transaction requests, the location of each of the transaction details may be located in a different position with each image. This may prevent malware or other malicious software from determining the location of transaction details within multiple images thereby preventing the malware from truncating such information. For instance, such techniques may prevent malware from changing a transaction amount and then truncating the transaction amount from the security image thereby preventing the user from viewing the modified transaction amount. Similarly, the location of confirmation codes and/or abort codes within machine readable resistant security media objects may be randomized across multiple transactions.

Figure 5B:
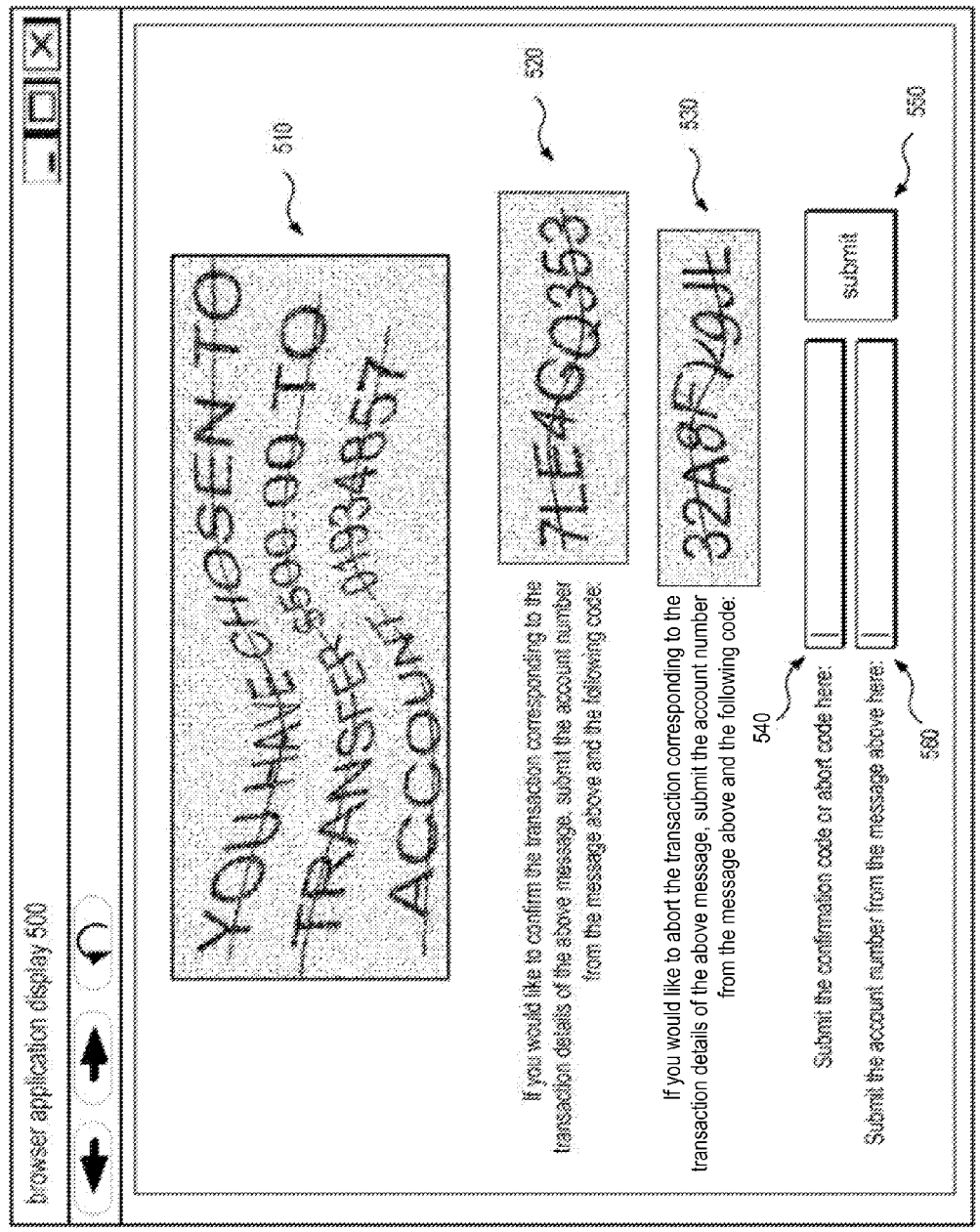

FIG. 5B illustrates another example of a browser application display, which includes multiple machine readable resistant security media objects, according to some embodiments. This display may in various embodiments be generated by a transaction verification component, such as transaction verification component 100 described above, and provided to browser application 155 to be viewed by a user. Note that like numbered elements of FIG. 5B may be substantially similar to the respective elements of FIG. 5A. In addition to submitting a confirmation code or abort code as illustrated by text entry field 540 (described above in regard to FIG. 5A), FIG. 5B may prompt the user to enter information from machine readable resistant security media object 510. In the illustrated embodiment, such information may include the account number indicated by machine readable resistant security media object 510, as illustrated by text entry field 560 and corresponding submit control 550. However, in various embodiments, the information to be submitted in text entry field 560 may include other additional verification information from machine readable resistant security media object 510, such as a particular word (e.g., the third word of the message), the transaction amount indicated by object 510, or some other code (e.g., a security code, passcode, passphrase, or other security related information) (not illustrated). By prompting the user to enter verification information from machine readable resistant security media object 510, browser application display 500 may provide an additional layer of security for the transaction. For example, by prompting the user to enter verification information from machine readable resistant security media object 510, the browser application display may prevent malware or other malicious software from intercepting and modifying (or deleting) the account details of machine readable resistant security media object 510 since transaction verification may in some cases fail if the correct information is not submitted via text entry field 560. In various embodiments, browser application display 500 may be employed by the transaction verification component described herein. Accordingly, the transaction verification component may in various embodiments be configured to complete a transaction if the submitted verification information (e.g., the account number) is the same as the corresponding information indicated by machine readable resistant security media object 510 and if the submitted confirmation code is the same as the confirmation code indicated by machine readable resistant security media object 520. In some cases, the transaction verification component may be configured to abort the transaction if the submitted verification information is not the same as the corresponding information indicated by machine readable resistant security media object 510.

Various embodiments of a system and method for in-band transaction verification, as described herein, may be executed on one or more computer systems, which may interact with various other devices. One such computer system is computer system 600 illustrated by FIG. 6. Computer system 600 may be capable of implementing a transaction verification component, such as transaction verification component 100. In the illustrated embodiment, computer system 600 includes one or more processors 610 coupled to a system memory 620 via an input/output (I/O) interface 630. Computer system 600 further includes a network interface 640 coupled to I/O interface 630, and one or more input/output devices 650, such as cursor control device 660, keyboard 670, and display(s) 680. In some embodiments, it is contemplated that embodiments may be implemented using a single instance of computer system 600, while in other embodiments multiple such systems, or multiple nodes making up computer system 600, may be configured to host different portions or instances of embodiments. For example, in one embodiment some elements may be implemented via one or more nodes of computer system 600 that are distinct from those nodes implementing other elements.

In various embodiments, computer system 600 may be a uniprocessor system including one processor 610, or a multiprocessor system including several processors 610 (e.g., two, four, eight, or another suitable number). Processors 610 may be any suitable processor capable of executing instructions. For example, in various embodiments processors 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA.

System memory 620 may be configured to store program instructions 622 and/or data 632 accessible by processor 610. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing a transaction verification component, such as transaction verification component 100 described above, are shown stored within system memory 620 as transaction verification component 625. In other embodiments, program instructions and/or data may be received, sent or stored upon different types of computer-accessible media or on similar media separate from system memory 620 or computer system 600. Generally speaking, a computer-accessible medium may include storage media or memory media such as magnetic or optical media, e.g., disk or CD/DVD-ROM coupled to computer system 600 via I/O interface 630. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 640.

In one embodiment, I/O interface 630 may be configured to coordinate I/O traffic between processor 610, system memory 620, and any peripheral devices in the device, including network interface 640 or other peripheral interfaces, such as input/output devices 650. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computer system 600 and other devices attached to a network, such as other computer systems (e.g., client 150), or between nodes of computer system 600. In various embodiments, network interface 640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 650 may, in some embodiments, include one or more display terminals, keyboards, keypads, touchpads, scanning devices, voice or optical recognition devices, or any other devices suitable for entering or accessing data by one or more computer systems 600. Multiple input/output devices 650 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

Figure 6:
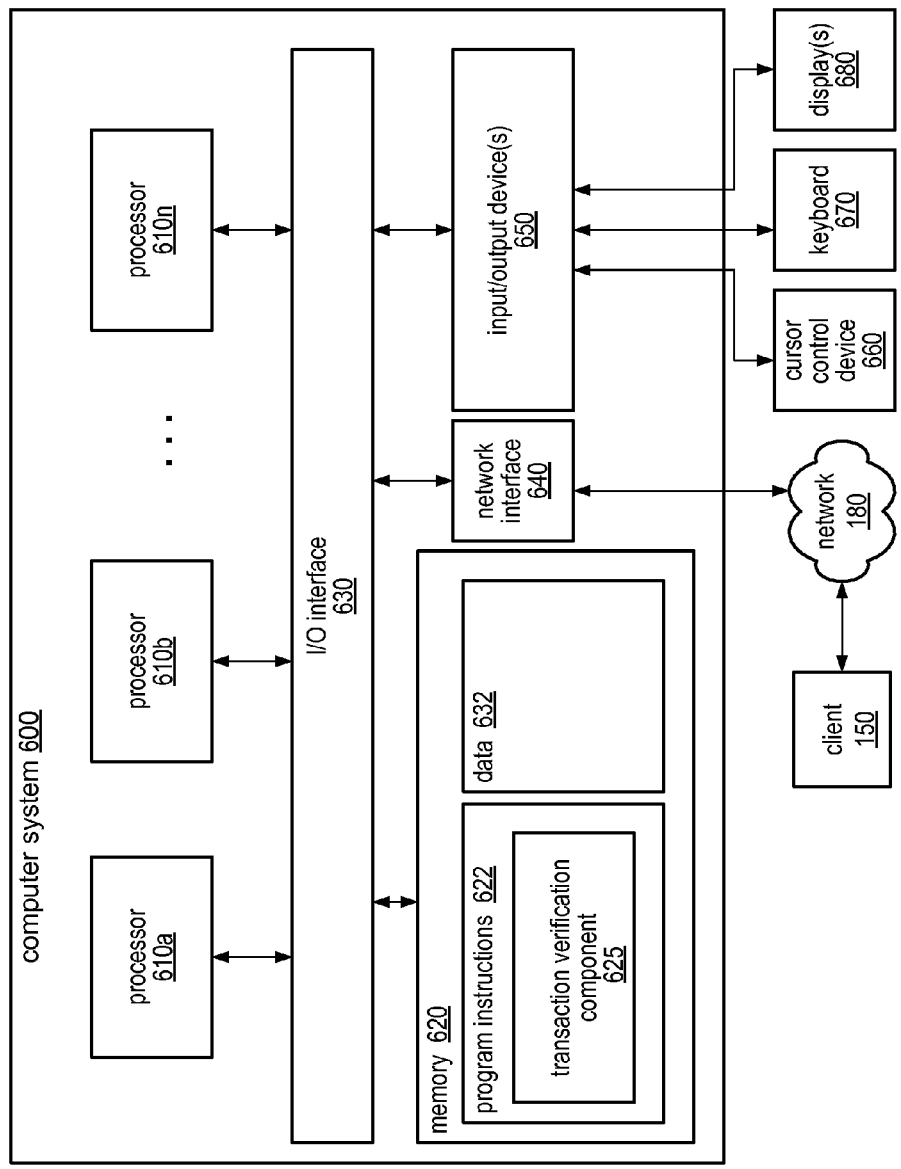
FIG. 6 illustrates a computing system suitable for implementing elements of a system and method for in-band transaction verification, according to one embodiment.

As shown in FIG. 6, memory 620 may include program instructions 622 configured to implement a transaction verification component, such as transaction verification component 100. In one embodiment, transaction verification component 625 may implement the methods described above, such as the method illustrated by FIG. 4. In other embodiments, different elements and data may be included.

Those skilled in the art will appreciate that computer system 600 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, various embodiments may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the steps of the methods may be changed, and various elements may be added, reordered, combined, omitted, modified, etc. Various modifications and changes may be made as would be obvious to a person skilled in the art having the benefit of this disclosure.

The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A computer-implemented method, comprising:
receiving, by a computer, a request to perform a transaction from a remote client;
providing, by the computer, the remote client with a transaction confirmation request comprising one or more machine readable resistant security media objects that include one or more transaction details that are descriptive of the transaction, a transaction confirmation code for confirming the transaction, and an abort code for aborting the transaction, each said security media object being machine readable resistant based on said one or more transaction details, said transaction confirmation code, and said abort code each being provided in a distorted form relative to a non-distorted version of said one or more transaction details, said transaction confirmation code, and said abort code, the transaction confirmation request including a challenge that requests a user of the remote client to respond with said abort code or with both said confirmation code and at least one of the one or more transaction details;
receiving, by the computer, a response to said transaction confirmation request from the remote client, at least a portion of said response being specified by the user of the remote client; and
verifying, by the computer, said response based on a comparison of the user-specified portion of the response received from the remote client to the abort code, the transaction confirmation code, and the transaction detail previously provided to the remote client in distorted form and requested by said challenge.

2. The method of claim 1, wherein the method further comprises:
determining, based on the comparison, that the user-specified portion of the response matches the abort code;
in response to determining that the user-specified portion of the response matches the abort code, aborting said transaction.

3. The method of claim 1, further comprising:
determining that a digital signature of the response is invalid; and
in response to determining that a digital signature of the response is invalid, aborting said transaction.

4. The method of claim 3, wherein said response is digitally signed using a secret key from a smart card device configured to securely store the secret key.

5. The method of claim 1, wherein the request to perform the transaction is received through a communication channel, wherein the transaction confirmation request is provided through the communication channel, and wherein the response to said transaction request is received through the communication channel.

6. The method of claim 1, further comprising:
detecting a transaction anomaly based on said request to perform the transaction; and
wherein the transaction confirmation request is provided in response to said detecting the transaction anomaly.

7. The method of claim 1, wherein said transaction confirmation code is distorted such that machine recognition techniques for determining the transaction confirmation code from the one or more machine readable resistant security media objects are less effective than machine readable techniques for determining the transaction confirmation code from one or more media objects that indicate the same transaction confirmation code without said distortion.

8. The method of claim 7, wherein at least one of said one or more machine readable resistant security media objects comprises an image that graphically indicates said transaction confirmation code and said distortion.

9. The method of claim 7, wherein at least one of said one or more machine readable resistant security media objects comprises audio that audibly indicates said transaction confirmation code and said distortion.

10. A system, comprising:
a processor; and
a memory coupled to the processor, wherein the memory comprises program instructions that, responsive to execution by the processor, cause the processor to perform:
receiving a request to perform a transaction from a remote client;
providing the remote client with a transaction confirmation request comprising one or more machine readable resistant security media objects that include one or more transaction details that are descriptive of the transaction, a transaction confirmation code for confirming the transaction, and an abort code for aborting the transaction, each said security media object being machine readable resistant based on said one or more transaction details, said transaction confirmation code, and said abort code being in a distorted form relative to a non-distorted version of said one or more transaction details, said confirmation code, and said abort code, the transaction confirmation request including a challenge that requests a user of the remote client to respond with said abort code or with both said confirmation code and at least one of the one or more transaction details;
receiving a response to said transaction confirmation request from the remote client, at least a portion of said response being specified by the user of the remote client; and
verifying said response based on a comparison of the user-specified portion of the response received from the remote client to the abort code, the transaction confirmation code, and the transaction detail previously provided to the remote client in distorted form and requested by said challenge.

11. The system of claim 10, wherein the program instructions, responsive to execution by the processor, further cause the processor to perform:
determining, based on the comparison, that the user-specified portion of the response matches the abort code;
in response to said determination that the user-specified portion of the response matches the abort code, aborting said transaction.

12. The system of claim 10, wherein the program instructions, responsive to execution by the processor, further cause the processor to perform:
determining that a digital signature of the response is invalid; and
in response to said determination that a digital signature of the response is invalid, aborting said transaction.

13. The system of claim 10, wherein the program instructions, responsive to execution by the processor, cause the processor to perform receiving the request to perform the transaction through a communication channel, providing the transaction confirmation request through the communication channel, and receiving the response to said transaction request through the communication channel.

14. The system of claim 10, wherein the program instructions, responsive to execution by the processor, cause the processor to perform:
  detecting a transaction anomaly based on said request to perform the transaction; and
  providing the transaction confirmation request to the remote client in response to said detecting the transaction anomaly.

15. The system of claim 10, wherein the transaction confirmation code is distorted such that machine recognition techniques for determining the transaction confirmation code from the one or more machine readable resistant security media objects are less effective than machine readable techniques for determining the transaction confirmation code from one or more media objects that indicate the same transaction confirmation code without said distortion.

16. The system of claim 10, wherein a particular machine readable resistant security media object of said one or more machine readable resistant security media objects indicates said transaction details of the transaction, wherein another machine readable resistant security media object of said one or more machine readable resistant security media objects indicates said transaction confirmation code.

17. A non-transitory computer-readable storage medium storing program instructions that, responsive to execution by a computer, cause the computer to perform operations comprising:
  receiving a request to perform a transaction from a remote client;
  providing the remote client with a transaction confirmation request comprising one or more machine readable resistant security media objects that include one or more transaction details that are descriptive of the transaction, a transaction confirmation code for confirming the transaction, and an abort code for aborting the transaction, each said security media object being machine readable resistant based on said one or more transaction details, said transaction confirmation code, and said abort code being in a distorted form relative to a non-distorted version of said one or more transaction details, said transaction confirmation code, and said abort code, the transaction confirmation request including a challenge that requests a user of the remote client to respond with said abort code or with both said confirmation code and at least one of the one or more transaction details;
  receiving a response to said transaction confirmation request from the remote client, at least a portion of said response being specified by the user of the remote client;
  comparing the user-specified portion of the response to the transaction confirmation code, the transaction detail, and the abort code; and
  verifying said response based on the user-specified portion matching the abort code, or the transaction confirmation code and the transaction detail.

18. The medium of claim 17, wherein the operations further comprise:
  determining that the user-specified portion of the response matches the abort code;
  in response to said determination that the user-specified portion of the response matches the abort code, aborting said transaction.

19. The medium of claim 17, wherein the operations further comprise:
  determining that a digital signature of the response is invalid; and
  in response to said determination that the digital signature of the response is invalid, aborting said transaction.

20. The medium of claim 19, wherein said response is digitally signed using a secret key from a smart card device configured to securely store the secret key.

21. The medium of claim 17, wherein the operations further comprise receiving the request to perform the transaction through a communication channel, providing the transaction confirmation request through the communication channel, and receiving the response to said transaction request through the communication channel.

22. The medium of claim 17, wherein the operations further comprise:
  detecting a transaction anomaly based on said request to perform the transaction; and
  providing the transaction confirmation request to the remote client in response to said detecting the transaction anomaly.

23. The medium of claim 17, wherein the transaction confirmation code is distorted such that machine recognition techniques for determining the transaction confirmation code from the one or more machine readable resistant security media objects are less effective than machine readable techniques for determining the transaction confirmation code from one or more media objects that indicate the same transaction confirmation code without said distortion.

24. The medium of claim 23, wherein at least one of said one or more machine readable resistant security media objects comprises an image that graphically indicates said transaction confirmation code and said distortion.

25. The method of claim 1, wherein said verifying of the response comprises verifying, based on the comparison, that the user-specified portion of the response matches both the transaction confirmation code and the transaction detail previously provided to the remote client in distorted form and requested by said challenge, and the method further comprises initiating the transaction based on said match.

* * * * *